United States Patent
Majer

(10) Patent No.: US 11,821,470 B2
(45) Date of Patent: Nov. 21, 2023

(54) ACTUATING DEVICE FOR A COUPLING DEVICE, COUPLING DEVICE HAVING SUCH AN ACTUATING DEVICE AND METHOD FOR MANUFACTURING SUCH AN ACTUATING DEVICE

(71) Applicant: BorgWarner Inc., Auburn Hills, MI (US)

(72) Inventor: Denis Majer, Neulußheim (DE)

(73) Assignee: BorgWarner Inc., Auburn Hills, MI (US)

( * ) Notice: Subject to any disclaimer, the term of this patent is extended or adjusted under 35 U.S.C. 154(b) by 109 days.

(21) Appl. No.: 17/453,287

(22) Filed: Nov. 2, 2021

(65) Prior Publication Data
US 2022/0145911 A1    May 12, 2022

(30) Foreign Application Priority Data
Nov. 7, 2020 (DE) .......................... 102020006849.9

(51) Int. Cl.
F16D 25/10     (2006.01)
F16D 125/02    (2012.01)

(52) U.S. Cl.
CPC .......... F16D 25/10 (2013.01); *F15B 2201/60* (2013.01); *F15B 2215/30* (2013.01); *F16D 2125/02* (2013.01)

(58) Field of Classification Search
CPC .... F16D 25/10; F16D 2125/02; F16D 25/063; F16D 25/0635; F16D 25/0638
See application file for complete search history.

(56) References Cited

U.S. PATENT DOCUMENTS

| | | | |
|---|---|---|---|
| 4,732,253 A * | 3/1988 | Hiramatsu | F16D 25/0638 192/48.618 |
| 2012/0145511 A1* | 6/2012 | Wilton | F16D 25/12 192/85.17 |

FOREIGN PATENT DOCUMENTS

DE    102018009252 A1 *  5/2020 ......... F16D 25/0638

* cited by examiner

*Primary Examiner* — Stacey A Fluhart
*Assistant Examiner* — Aimee Tran Nguyen
(74) *Attorney, Agent, or Firm* — Howard & Howard Attorneys PLLC

(57) ABSTRACT

A hydraulic actuating device for a coupling device having an actuating piston, a piston chamber assigned to the actuating piston and a supply chamber which is arranged further inwards in the radial direction than the piston chamber and via which a hydraulic fluid can be supplied to the piston chamber, wherein the supply chamber is delimited in a first axial direction by a first housing part and in a second axial direction opposite to the first axial direction by a second housing part, and the first housing part is fastened to a hub. The first housing part is fastened to the hub by clamping the second housing part in the axial direction between the first housing part and the hub. Furthermore, the present invention relates to a coupling device having such an actuating device as well as a method for manufacturing such an actuating device.

20 Claims, 1 Drawing Sheet

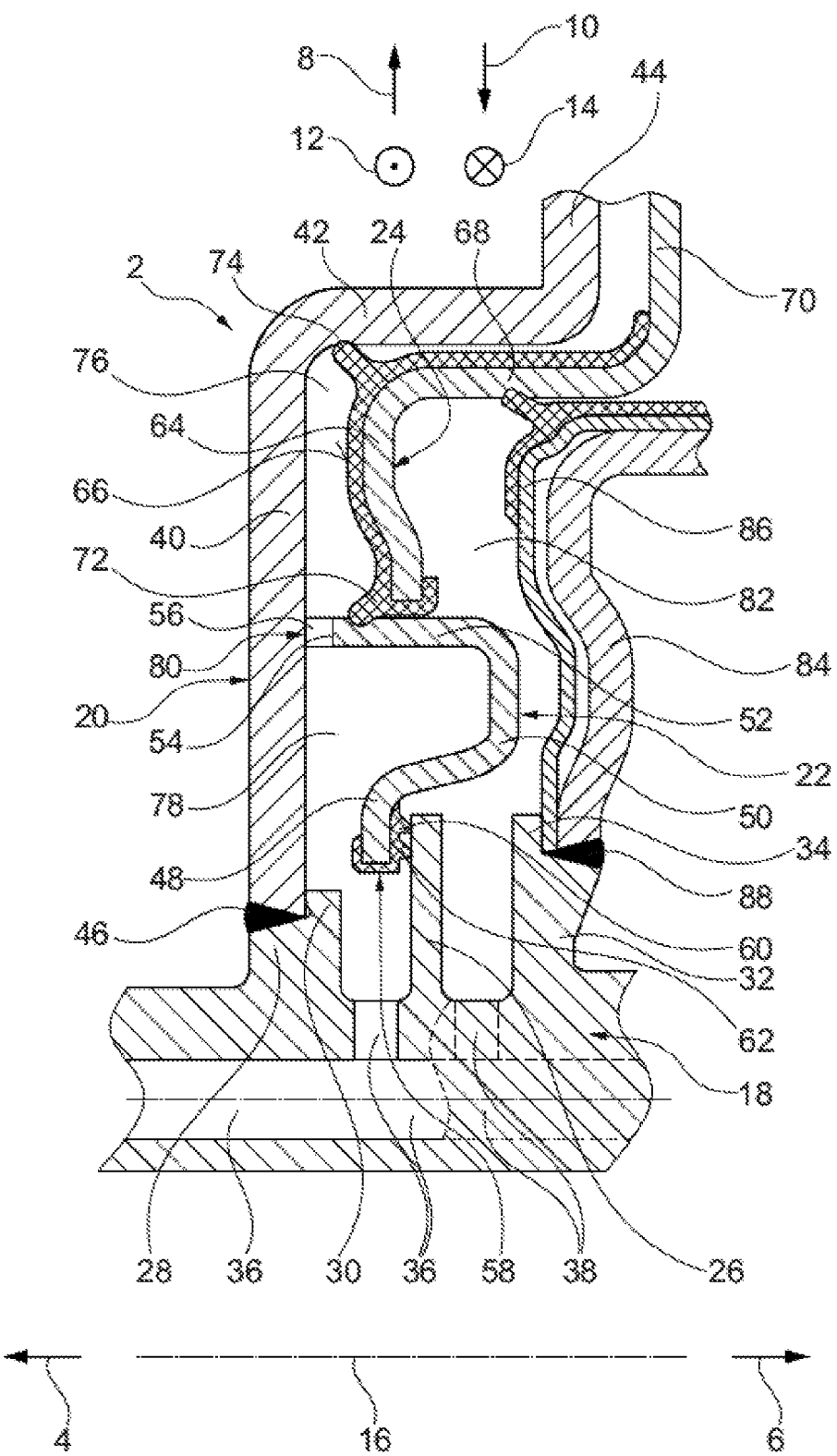

ACTUATING DEVICE FOR A COUPLING DEVICE, COUPLING DEVICE HAVING SUCH AN ACTUATING DEVICE AND METHOD FOR MANUFACTURING SUCH AN ACTUATING DEVICE

CROSS-REFERENCE TO RELATED APPLICATIONS

This application claims priority pursuant to 35 U.S.C. 119(a) to German Patent Application No. 102020006849.9, filed Nov. 7, 2020, which application is incorporated herein by reference in its entirety.

BACKGROUND

The present invention relates to a hydraulic actuating device for a coupling device having an actuating piston, a piston chamber assigned to the actuating piston and a supply chamber which is arranged further inwards in the radial direction than the pressure chamber and via which a hydraulic fluid can be supplied to the piston chamber, wherein the supply chamber is delimited in one axial direction by a first housing part and in a second axial direction opposite the first axial direction by a second housing part, and the first housing part is fastened to a hub. Furthermore, the present invention relates to a hydraulically actuatable coupling device having such an actuating device. Furthermore, the present invention relates to a method for manufacturing such a hydraulic actuating device.

From use in practice, hydraulic actuating devices within a coupling device, such as a lamella clutch are known. The known actuating devices are substantially composed of an actuating piston, a first housing part, a second housing part and a hub, which can form the corresponding hub for a coupling device. The actuating piston is arranged such that it is assigned to a piston chamber. A supply chamber is arranged radially further inwards than the piston chamber, via which a hydraulic fluid can be supplied to the piston chamber such that the actuating piston can be driven. The piston chamber and the supply chamber are thus in fluid connection with each other, wherein the division into piston chamber and supply chamber results from the fact that the actuating piston is arranged with its piston surface further out in the radial direction, for example in order to achieve a particularly compact actuating piston. The supply chamber is delimited in a first axial direction by the first housing part and in a second axial direction opposite the first axial direction by a second housing part. The first housing part is fastened to the hub while ensuring the tightness of the supply chamber, usually welded to the hub. The same applies to the second housing part, which is welded to the hub in a sealing manner. Furthermore, the actuating piston is supported radially inwards on the second housing part and is guided or moveable in the axial directions.

The known hydraulic actuating devices for a coupling device have proven their worth, but are in need of improvement in that they are relatively costly to manufacture. Moreover, the known actuating devices tend to an increased hysteresis behaviour due to a play between the actuating piston and the second housing part, on which the actuating piston is supported inwardly in the radial direction and is guided in a displaceable manner in the axial direction.

It is therefore an object of the present invention to develop a hydraulic actuating device of the generic type in such a way that it has a structure that is particularly easy to manufacture and exhibits a lower hysteresis behaviour. In addition, the object of the present invention is to create a hydraulically actuatable coupling device having such an advantageous hydraulic actuating device. Furthermore, the object of the present invention is to provide a simplified method for manufacturing a hydraulic actuating device for a coupling device.

SUMMARY

This object is solved by the features specified in claims 1, 8 and 9. Advantageous embodiments of the invention are the subject of the sub-claims.

The present invention relates to a hydraulic actuating device for a coupling device, i.e. for a coupling device which can be actuated hydraulically. The hydraulic actuating device according to the invention has an actuating piston. The actuating piston is preferably an annular piston, which moreover is particularly preferably formed as a sheet metal or sheet metal moulded part. A piston chamber is assigned to the actuating piston, within which the actuating piston can be moved if corresponding pressure conditions prevail inside the piston chamber. Furthermore, the actuating device has a supply chamber, wherein the supply chamber is arranged further inwards in the radial direction than the piston chamber. Both the piston chamber and the supply chamber are preferably designed as annular chambers. It is also preferable if the piston chamber and the supply chamber are arranged at least partially nested with each other in the radial direction. The supply chamber is in fluid connection with the piston chamber in such a way that a hydraulic fluid can be supplied to the piston chamber via the supply chamber and vice versa. The supply chamber is delimited in a first axial direction by a first housing part and in a second axial direction opposite to the first axial direction by a second housing part. It is preferred if both the first housing part and the second housing part are formed as sheet metal or sheet metal moulded parts. At least the second housing part is preferably annular, wherein this applies particularly preferably also to the first housing part. The first housing part is attached to a hub, for example a coupling hub for the coupling device. Here, it is preferred if the first housing part is connected to the hub, particularly preferably welded thereto, at least while being fixed thereto in the first and second axial directions on the hub. It has also been found to be advantageous if a rotary drive connection between the hub and the first housing part is likewise achieved by fixing the first housing part to the hub. Whereas in some hydraulic actuators known from practice, the second housing part is also welded to the hub to delimit the supply chamber in the second axial direction, such a fastening of the second housing part to the hub is dispensed with in the actuating device according to the invention. Rather, the first housing part is fastened to the hub while clamping the second housing part in the axial direction between the first housing part and the hub.

In the hydraulic actuating device according to the invention, the second housing part can thus be dispensed with, while dispensing with fastening means for axially fixing the second housing part to the hub, in particular welding of the second housing part to the hub is dispensable, wherein an axial fixing of the second housing part relative to the hub and the first housing part is nevertheless ensured by clamping the second housing part. Consequently, the step of fastening the second housing part to the hub is omitted in the manufacture of the actuating device, in particular since fastening is effected, preferably solely, by fastening the first housing part to the hub with clamping of the second housing part. The manufacture of the actuating device is thereby considerably simplified.

In an advantageous embodiment of the actuating device according to the invention, the second housing part is supported indirectly or directly on the hub in the second axial direction.

In a further advantageous embodiment of the actuating device according to the invention, the second housing part is supported on the hub in the second axial direction with the interposition of a seal in order to ensure the tightness of the supply chamber and, optionally, the tightness of a compensation chamber adjacent to the supply chamber or similar. The seal is preferably an annular or peripheral seal, which particularly preferably has at least two protruding sealing lips to ensure tightness. In this embodiment, it is also preferable if the seal is attached to the second housing part, although the seal could in principle also be attached to the hub.

According to a further advantageous embodiment of the actuating device according to the invention, the second housing part is supported on a radially projecting support section of the hub. Here, it is preferred if the radially projecting support section is formed in one piece with the hub, on the one hand to ensure secure support of the second housing part in the second axial direction and, on the other hand, to ensure simplified manufacture. Alternatively or additionally, the support section in this embodiment is formed peripherally in the peripheral direction. Thus, the support section could be formed in the manner of a peripheral collar and/or as an annular disc-shaped section of the hub.

In a further advantageous embodiment of the actuating device according to the invention, the second housing part is supported indirectly or directly on the first housing part in the first axial direction. In this case, it is preferred if the support of the second housing part on the first housing part is further outwards in the radial direction than the support of the second housing part on the hub. Direct support of the second housing part on the first housing part is also preferred insofar as a sealing element or flexible element does not necessarily have to be arranged at this point, in particular since a fluid connection between the piston chamber and the supply chamber can exist here anyway and a certain flexibility can already be achieved by the previously mentioned seal between the second housing part and the hub.

Based on the embodiment described above, in a further advantageous embodiment of the actuating device according to the invention, the second housing part has at least two axial support projections which are supported on the first housing part with the formation of intermediate through openings for establishing a fluid connection between the supply chamber and the piston chamber. The at least two axial support projections ensure a relatively stable support here, although it is preferred if three or more support projections are provided, which are moreover evenly spaced from one another in the peripheral direction, in order to obtain substantially identical through openings. Alternatively or in addition to the axial support projections on the second housing part, in this embodiment at least two axial support projections can also be provided on the first housing part, which are supported on the second housing part to form intermediate through openings for establishing a fluid connection between the supply chamber and the piston chamber.

In a particularly advantageous embodiment of the actuating device according to the invention, the second housing part is supported in a floating manner in the radial direction on the hub, optionally on the previously mentioned support section of the hub. This allows the second housing part to move in the radial direction relative to the hub both during assembly and during operation of the actuating device. Thus, a self-centring of the second housing part can be achieved during assembly, as will be explained again later with reference to the actuating piston which is also to be assembled. Moreover, hysteresis behaviour during operation of the actuating device, which can be attributed to a play between the actuating piston on the one hand and the second housing part on the other, is largely suppressed.

In a further preferred embodiment of the actuating device according to the invention, the second housing part is detachably supported on the hub, optionally the previously mentioned support section of the hub.

In principle, both the aforementioned floating support of the second housing part in the radial direction and the detachable arrangement of the same on the hub could be achieved with the aid of certain fastening means. In a further preferred embodiment of the actuating device according to the invention, however, the second housing part is supported on the hub in the second axial direction between the second housing part and the hub, dispensing with fastening means for axially and/or radially fixing the second housing part to the hub, in order to achieve a simple structure of the actuating device which is equally easy to manufacture.

For the aforementioned support of the second housing part in the first axial direction on the first housing part, the preceding embodiments for the support of the second housing part on the hub preferably apply accordingly. Thus, in a further preferred embodiment of the actuating device according to the invention, the second housing part is supported in the radial direction in a floating and/or detachable manner and/or by dispensing with fastening means for axial and/or radial fixing of the second housing part to the first housing part between the second housing part and the first housing part. The previously mentioned advantages apply here accordingly.

In a particularly preferred embodiment of the actuating device according to the invention, the second housing part is supported radially outwardly on the actuating piston in order to nevertheless achieve secure positioning and centring of the second housing part within the actuating device despite the aforementioned floating arrangement of the second housing part in the radial direction. For this purpose, it is preferred if the second housing part has an axial section, which could also be referred to as a tubular section, in order to be able to support the second housing part securely in the radial direction outwards on the actuating piston and also to be able to guide and move the actuating piston itself securely in its direction of movement, preferably the opposite axial directions. The second housing part is also preferably supported with the interposition of a seal which serves to seal the piston chamber. The seal is preferably attached to the actuating piston. Thanks to the floating arrangement of the second housing part in the radial direction, the radial play between the actuating piston and the second housing part can be reliably compensated without resulting in increased hysteresis behaviour of the actuating device.

Based on the above-described embodiment, in a further particularly preferred embodiment of the actuating device according to the invention, the actuating piston is supported radially outwards on the first housing part, such that the radial positioning of the second housing part results from the support of the latter on the actuating piston and from the support of the actuating piston on the first housing part. It is preferred if the housing part has an axial section, which can also be referred to as a tubular section, on which the actuating piston is supported radially outwards. Furthermore, it has been found to be advantageous if the actuating piston is supported on the first housing part, optionally the axial section of the first housing part, in the radially outward direction with the interposition of a seal for sealing the piston chamber. In this embodiment, it is moreover preferred if said seal is attached to the actuating piston. Also, it is has been found to be advantageous if the aforementioned seal between the actuating piston and the second housing part is cohesively or integrally formed with the seal between the actuating piston and the first housing part, wherein both seals are or have been particularly preferably attached to the actuating piston as a cohesive unit.

In a further preferred embodiment of the actuating device according to the invention, a compensation chamber is associated with the piston chamber for achieving at least partial, preferably complete, centrifugal compensation. The compensation chamber is preferably delimited in the first axial direction by both the actuating piston and the second housing part. When using the actuating device with a dual clutch, in particular a concentric dual clutch, it has proved advantageous if the compensation chamber is delimited in the second axial direction by a further housing part, possibly a lamella carrier and/or a sealing element arranged thereon.

In a further advantageous embodiment of the actuating device according to the invention, the supply chamber is separated from the compensation chamber by the second housing part. In this case, it is preferred if the supply chamber and the compensation chamber are directly delimited by the second housing part, such that the fluid in the supply chamber and the fluid in the compensation chamber come into direct contact with the second housing part.

According to a further advantageous embodiment of the actuating device according to the invention, at least one fluid line for supplying a hydraulic fluid into the supply chamber is formed in the hub. Here, it has proved to be advantageous if the hub is tubular at least in sections, wherein the fluid line extends within the wall of the tubular section or the tubular hub, optionally in the axial direction. Alternatively or additionally, at least one fluid line for supplying a compensating fluid into the compensating chamber is formed in the hub, wherein this fluid line also preferably extends in the wall or a wall section of a completely or partially tubular hub, optionally in the axial direction.

The hydraulically actuatable coupling device according to the invention is designed for the drive train of a motor vehicle, wherein the latter has a hydraulic actuating device of the type according to the invention. With regard to the advantages of such a coupling device, reference is made to the advantages of the actuating device according to the invention described above, which also apply in a corresponding manner to the coupling device.

In an advantageous embodiment of the coupling device according to the invention, this is designed as a dual clutch and/or lamella clutch. It has proved advantageous here if the dual clutch and/or lamella clutch is designed as a wet-running dual clutch and/or lamella clutch.

In a particularly advantageous embodiment of the coupling device according to the invention, the actuating device serves to actuate an outer coupling of the coupling device designed as a concentric dual clutch. It is also preferred in this embodiment if the outer coupling and the inner coupling of the concentric dual clutch are arranged at least partially nested in the radial direction.

The method according to the invention serves to manufacture a hydraulic actuating device, preferably a hydraulic actuating device of the type according to the invention described above, for a coupling device. In the method, a hub, a first housing part and a second housing part are provided. The second housing part is pushed onto the hub. Subsequently or simultaneously, the first housing part is pushed onto the hub while clamping the second housing part in the axial direction between the first housing part and the hub and creating a supply chamber in the axial direction between the first and second housing parts. The first housing part is then secured to the hub to provide a secure arrangement of the first and second housing parts within the actuator to be created. By fixing the first part to the hub, the first housing part is fixed to the hub at least in the two opposite axial directions, wherein it is preferred if the first housing part is also fixed to the hub while achieving a rotary driving connection with the hub. For this purpose, it is preferred if the first housing part is fixed to the hub by welding. As already described with reference to the actuating device according to the invention, welding of the second housing part to the hub, for example, is thereby dispensed with and other fastenings of the second housing part to the hub, with the exception of clamping, are also dispensed with.

In a preferred embodiment of the method according to the invention, the second housing part is supported on the hub between the second housing part and the hub by clamping in a floating and/or detachable manner in the radial direction and/or without fastening means for axial and/or radial fixing of the second housing part to the hub. A later fastening of the second housing part to the hub of whatever kind can thus be dispensed with, as is further preferred.

According to a further preferred embodiment of the method according to the invention, the second housing part is supported by the clamping in the radial direction in a floating and/or detachable manner and/or without fastening means for axial and/or radial fixing of the second housing part to the first housing part between the second housing part and the first housing part on the first housing part. Here, too, a subsequent fastening of the second housing part to the first housing part can be dispensed with, as is further preferred.

In a particularly preferred embodiment of the method according to the invention, an actuating piston is further provided. Subsequently, the first housing part, the second housing part and the actuating piston are assembled while supporting the second housing part radially outwardly on the actuating piston and while supporting the actuating piston radially outwardly on the first housing part. Subsequently, the first housing part and the second housing part together with the actuating piston are then pushed onto the hub before the first housing part is fastened to the hub as mentioned above. This embodiment is advantageous in that, before the first and second housing parts are pushed onto the hub together with the actuating piston, a radial alignment of the second housing part relative to the first housing part or even a coaxial arrangement of the second housing part relative to the first housing part is achieved which substantially corresponds to the arrangement in the finished actuating device, such that the manufacturing process is considerably simplified. A complex alignment of the second housing part relative to the hub during manufacture is not necessary.

BRIEF DESCRIPTION

The invention is explained in more detail below by means of an exemplary embodiment with reference to the attached drawing. The single FIG. 1 shows a partial side view of an embodiment of the hydraulic actuating device within a coupling device in sectional view.

DETAILED DESCRIPTION

FIG. 1 shows a hydraulic actuating device 2 in a coupling device for the drive train of a motor vehicle. In FIG. 1, the opposing axial directions 4, 6, the opposing radial directions 8, 10 and the opposing peripheral directions 12, 14 of the actuating device 2 or of the coupling device are indicated by corresponding arrows, wherein the actuating device 2 or the coupling device is rotatable in the peripheral directions 12, 14 around an axis of rotation 16 extending in the axial directions 4, 6. The two axial directions 4, 6 are hereinafter also referred to as first axial direction 4 and second axial direction 6.

The actuating device 2 is substantially composed of a hub 18, a first housing part 20, a second housing part 22 and an actuating piston 24. The hub 18 is substantially tubular and extends in the axial directions 4, 6. The hub 18 preferably functions here as a hub of the coupling device, arranged and supported on a fixed support tube, optionally on the input side.

The hub 18 has a support section 26 projecting in the radial direction 8 and formed integrally with the hub 18. The support section 26 is substantially annularly disc-shaped, wherein this is formed peripherally in the peripheral directions 12, 14. A second support section 28 is arranged at a distance from the support section 26 in the first axial direction 4, which is also formed integrally with the hub 18 and peripherally in the peripheral directions 12, 14. On its side facing the support section 26, the second support section 28 also has a projection 30 which projects outwards in the radial direction 8 beyond the rest of the second support section 28 and acts as a stop. In the second axial direction 6, spaced from the support section 26, a third support section 32 of the hub 18 is arranged, which in turn is formed integrally with the hub 18 and peripherally in the peripheral direction 12, 14. Thus, the third support section 32 projects outwardly in the radial direction 8 beyond the hub 18, wherein a projection 34 is also provided on the third support section 32 on its side facing the support section 26, which projection projects outwardly in the radial direction 8 beyond the rest of the third support section 32 and functions as a stop.

At least one fluid line 36 is formed in the hub 18 for supplying a hydraulic fluid to the supply chamber of the actuating device 2, which will be described in more detail later. This first fluid line 36 opens in the axial direction 4, 6 between the support section 26 and the second support section 28 and subsequently into the supply chamber described in more detail later. Furthermore, at least one second fluid line 38 is formed in the hub 18 for supplying a compensating fluid into the compensating space described in more detail later, which opens into said compensating space in the axial direction 4, 6 between the support section 26 and the third support section 32. First and second fluid lines 36, 38 extend substantially in the axial direction 4, 6 inside the wall of the tubular hub 18.

The first housing part 20 is formed to be annularly peripheral in the peripheral direction 12, 14 and is designed as a sheet metal or sheet metal moulded part. Within the coupling device, the first housing part 20 preferably functions as a supporting section for a lamella supporting section for supporting the latter in the radial direction 8, 10. The first housing part 20 has a first radial section 40 extending substantially in the radial directions 8, 10, which extends outwards in the radial direction 8 starting from the hub 18. An axial section 42 adjoins the first radial section 40 in the radial direction 8 outwards and extends from the first radial section 40 in the second axial direction 6. A second radial section 44 of the first housing part 20 adjoins the end of the axial section 42 extending in the second axial direction 6, which second radial section extends outwards from the axial section 42 in the radial direction 8 in order to support the aforementioned lamella support section, wherein in this case, the lamella support section could also be formed integrally with the first housing part 20.

The first housing part 20 is pushed onto the hub 18 or its second support section 28 in the second axial direction 6 in such a way that the inner end of the first radial section 40 in the radial direction 10 is supported on the projection 30 in the second axial direction 6. Moreover, said end of the first radial section 40 is fixed to the second support section 28 of the hub 18 in such a way that the first housing part 20 is fixed to the hub 18 in the opposite axial directions 4, 6. Moreover, in the illustrated embodiment, a fastening is also achieved in which there is a rotationally driven connection between the hub 18 and the first housing part 20 in the peripheral directions 12, 14. This is achieved here by welding the first housing part 20 to the second support section 28 of the hub 18, as indicated in FIG. 1 by means of the weld 46.

The second housing part 22 is also annularly peripheral in the peripheral direction 12, 14 and is formed as a sheet metal or sheet metal moulded part. At its end pointing inwards in the radial direction 10, the second housing part 22 has a first radial section 48 which extends in the radial directions 8, 10 and is substantially annularly disc-shaped. Thus, the first radial section 48 is arranged substantially in a plane extending in the radial directions 8, 10. In the radial direction 8 outwardly, a second radial section 50 of the second housing part 22 adjoins the first radial section 48. In contrast to the first radial section 48, however, the second radial section 50 is curved or protruding in the second axial direction 6 relative to the first radial section 48. An axial section 52 of the second housing part 22 adjoins the end of the second radial section 50 lying on the outside in the radial direction 8, wherein the axial section 52 extends from the second radial section 50 in the first axial direction 4. At the end 54 of the axial section 52 pointing in the first axial direction 4, at least two axial support projections 56 are arranged, which project beyond the end 54 in the first axial direction 4 and are arranged on the second housing part 22 at a uniform distance from one another in the peripheral direction 12, 14 and are formed integrally therewith, wherein only one of the axial support projections 56 is shown in FIG. 1.

A peripheral seal 58 is further attached to the first radial section 48 of the second housing part 22, wherein the seal 58 has at least two peripheral sealing lips 60, 62 spaced apart from each other in the radial direction 8, 10 and formed on the side of the seal 58 facing in the second axial direction 6.

The actuating piston 24 is substantially annular and peripherally formed in the peripheral direction 12, 14. The actuating piston 24 is preferably formed as a sheet metal part or sheet metal moulded part. Thus, the actuating piston 24 has a first piston section 64 extending substantially in the radial directions 8, 10 and substantially defining the piston surface 66 facing in the first axial direction 4. A second piston section 68 adjoins the first piston section 64 outwardly in the radial direction 8, wherein the second piston section 68 extends from the first piston section 64 substantially in the second axial direction 6. A force transmission section 70 of the actuating piston 24 connects to the end of second piston section 68 pointing in the second axial direction 6, which force transmission section 70, for example, extends outwardly in the radial direction 8 starting from the second piston section 68 in order to cooperate with a lamella set of the coupling device not shown here.

A first peripheral seal 72 is provided to seal the gap in the radial direction 8, 10 between the axial section 52 of the second housing part 22 and the end of the first piston section 64 facing inward in the radial direction 10. In addition, a peripheral second seal 74 is provided to seal the gap in the radial direction 8, 10 between the second piston section 68 and the axial section 42 of the first housing part 20. Both seals 72, 74 are exemplary here and preferably attached to the actuating piston 24. Moreover, the two seals 72, 74 are formed contiguously and are fastened contiguously to the actuating piston 24.

The two piston sections 64, 68 together with the seals 72, 74 are inserted into the clearance in the radial direction 8, 10 between the axial section 52 of the second housing part 22 and the axial section 42 of the first housing part 20, such that the actuating piston 24 can be moved or displaced in the opposite axial directions 4, 6. A piston chamber 76, which can be pressurised with hydraulic pressure, is assigned to the actuating piston 24. The piston chamber 76 is delimited in the first axial direction 4 by the first radial section 40 of the first housing part 20 and in the opposite second axial direction 6 by the piston surface 66. In the radial direction 8 outwardly, the piston chamber 76 is delimited by the axial section 42 of the first housing part 20 and in the radial direction 10 inwardly the piston chamber 76 is delimited by the axial section 52 of the second housing part 22, although in the region of the axial section 52 of the second housing part 22 there is a fluid connection to the supply chamber 78 described in more detail below. The piston chamber 76 is annular, as is the supply chamber 78, wherein the actuating piston 24 can also be referred to as an annular piston.

The supply chamber 78 is arranged further inward in the radial direction 10 than the piston chamber 76, wherein the supply chamber 78 in the depicted embodiment is arranged in an advantageous manner nested with the piston chamber 76 in the radial direction 8, 10. A hydraulic fluid can be supplied to the supply chamber 78 via the previously mentioned at least one fluid line 36, wherein the hydraulic fluid can in turn be supplied to the piston chamber 76 via the supply chamber 78, and at least two through openings are provided for this purpose between the supply chamber 78 and the piston chamber 76, which will be discussed in more detail later. The supply chamber 78 is delimited in the first axial direction 4 by the first radial section 40 of the first housing part 20 and in the second axial direction 6 by the radial sections 48, 50 of the second housing part 22. In the radial direction 8 outwards, the supply chamber 78 is delimited by the axial section 52 of the second housing part 22, wherein the through openings 80 ensure the fluid connection with the piston chamber 76.

The first housing part 20 is fastened to the hub 18 via the weld 46 in the manner described above, with the second housing part 22 being clamped in the axial direction 4, 6 between the first housing part 20 and the hub 18, such that an additional fastening or fastening means required for this purpose for fastening the second housing part 22 to the hub 18 are not necessary, as a result of which the structure of the actuating device 2 and its manufacture are significantly simplified. By clamping the second housing part 22, the second housing part 22 is supported in the second axial direction 6 via its first radial section 48 directly, but with the interposition of the seal 58, on the hub 18, namely on its support section 26. On the other hand, the second housing part 22 is directly supported on the first radial section 40 of the first housing part 20 via the axial support projections 56 of the axial section 52 by being clamped in the first axial direction 4. Due to the at least two axial support projections 56, the support takes place with the formation of the previously mentioned intermediate through openings 80 for establishing the flow connection between the supply chamber 78 on the one hand and the piston chamber 76 on the other hand. Alternatively or in addition, corresponding axial support projections 56 could also be formed on the first radial section 40 of the first housing part 20, on which the end 54 of the axial section 52 of the second housing part 22 would then be supported with the formation of the intermediate through openings 80, although it is preferred if said axial support projections 56 are provided on the second housing part 22, optionally exclusively on the second housing part 22, particularly since the axial support projections 56 are easier to produce on the second housing part 22, which simplifies the manufacturing process.

It should also be noted that the second housing part 22 could in principle also be supported indirectly in the second axial direction 6 with the interposition of the seal 58 on the hub 18, namely on a support section 26 that is not formed integrally with the hub 18 but is fixed to the hub 18 in another way in the axial direction 4, 6. However, this would again increase the manufacturing effort to the extent that this separately formed support section 26 would have to be fixed to the hub 18 in a corresponding manufacturing step. It should also be mentioned that the intermediate seal 58 could in principle also be arranged on the support section 26, regardless of whether the support section 26 is formed integrally with or separately from the hub 18.

Although the second housing part 22 is clamped between the first housing part 20 and the hub 18 in the axial directions 4, 6, it is supported on the support section 26 of the hub 18 in a floating manner in the radial direction 8, 10 or in a moveable manner in the radial direction 8, 10. Also, the second housing part 22 is supported on the support section 26 of the hub 18 in such a way that the second housing part 22 is detachable from the support section 26 of the hub 18 and can be easily removed if the first housing part 20 would be removed from the hub 18 again. It is also apparent from FIG. 1 that fastening means for axially and/or radially fixing the first radial section 48 of the second housing part 22 to the support section 26 of the hub 18, which would be arranged between the first radial section 48 and the support section 26 of the hub 18, are completely dispensed with.

The same applies to the support in the first axial direction 4 on the first housing part 20. Thus, the second housing part 22 is supported in the radial direction 8, 10 in a floating manner and/or detachably and/or without fastening means for axial and/or radial fixing of the second housing part 22 to the first housing part 20, which would be arranged between the second housing part 22 and the first housing part 20, on the first housing part 20, more precisely on the first radial section 40 of the first housing part 20, via the axial support projections 56.

In order to achieve a relatively accurate positioning of the second housing part 22 with respect to the radial directions 8, 10 despite the floating arrangement of the second housing part 22 in the radial direction 8, 10, the axial section 52 of the second housing part 22 is supported in the radial direction 8 outwardly with the interposition of first seal 72 to seal the piston chamber 76 against the first piston section 64 of the actuating piston 24, wherein the actuating piston 24 is supported in the radial direction 8 outwardly with the interposition of the second seal 74 against the axial section 42 of the first housing part 20. Thanks to the floating arrangement of the second housing part 22 with respect to the radial directions 8, 10 and the flexibility of the first and second seals 72, 74, the second housing part 22 can slide or move to a certain extent in the radial directions 8, 10, such that it can centre itself in a way that is impossible with a conventional second housing part 22, which is fixed in the radial directions 8, 10 to the hub 18 or a support section 26 of the hub 18. Thus, not only is simplified manufacture ensured for the actuating device 2, but hysteresis behaviour of the actuating device 2 during operation is also effectively counteracted.

A compensation chamber 82 of the actuating device 2 is assigned to the piston chamber 76 to achieve at least partial, preferably complete, centrifugal compensation. It is preferred if at least 90% centrifugal compensation can be achieved thanks to the compensation chamber 82. The compensation chamber 82 can be filled with a corresponding compensation fluid via the aforementioned at least one second fluid line 38, thus via the hub 18. The compensation chamber 82 is delimited in the first axial direction 4 in a radially outer region by the first piston section 64 and in the radial direction 10 further inwardly by the first and second radial sections 48, 50 of the second housing part 22, wherein the fluid within the compensation chamber 82 can come into contact directly with said sections 64, 48, 50. Consequently, the supply chamber 78 is separated from the compensation space 82 by the second housing part 22, wherein both the supply chamber 78 and the compensation chamber 82 are directly delimited by the second housing part 22, particularly since the hydraulic fluid within the supply chamber 78 also comes into direct contact with the second housing part 22. In the second axial direction 6, the compensation chamber 82 is delimited by a third housing part 84, in this case by a sealing element 86 arranged on the third housing part 84, which serves to seal a gap between the third housing part 84 and the second piston section 68 and thus to seal the compensation chamber 82. The third housing part 84 can in turn be the support section for supporting a lamella support portion, which can in turn be integrally formed with such a lamella support portion. As can further be seen from FIG. 1, the third housing part 84, which is again substantially annular and formed as a sheet metal or metal moulded part, is attached to the third support section 32 of the hub 18 by sliding the third housing part 84 onto the third support section 32 while clamping the sealing element 86 between the third housing part 84 and the projection 34, wherein subsequently a fastening of the third housing part 84 was fastened to the hub 18 while achieving a fixing thereof in at least the axial directions 4, 6, here again for example by welding, as indicated by the weld 88.

The coupling device, in which the actuating device 2 is contained, is designed as a wet dual clutch and/or lamella clutch. The dual clutch is designed as a concentric dual clutch having an outer and inner coupling not shown in more detail, wherein the outer coupling is preferably arranged nested with the inner coupling in the radial direction 8, 10. The depicted actuating piston 24 serves to actuate the outer coupling of such a concentric dual clutch. The first housing part 20 serves to support an outer lamella support section of the outer coupling and can be formed separately from or integrally with this outer lamella support section. The third housing part 84 again serves to support an outer lamella support section of the inner coupling in the radial directions 8, 10, wherein the third housing part 84 can also be formed separately from or integrally with such an outer lamella support section of the inner coupling.

In the manufacture of the shown actuating device 2 or coupling device, the process steps described below are followed. Firstly, the hub 18, the first housing part 20 and the second housing part 22 are provided first. Subsequently, the second housing part 22 is pushed onto the hub 18 in the second axial direction 6, such that the first radial section 48 of the second housing part 22 is supported on the support section 26 of the hub 18 via the seal 58. Thereafter or simultaneously, the first housing part 20 is pushed onto the hub 18 in the second axial direction 6, wherein this occurs while clamping the second housing part 22 in the axial direction 4, 6 between the first housing part 20 and the supporting section 26 of the hub 18 and while creating the previously described supply chamber 78 in the axial direction 4, 6 between the first and second housing parts 20, 22. If the first radial section 40 is supported on the projection 34 of the second support section 28 after being pushed on in the second axial direction 6, the first housing part 20 is fastened to the hub 18, in this case by welding, as indicated by the weld 46.

In order to be able to position the two housing parts 20, 22 relatively exactly with respect to each other in the previously described actuating device 2 with respect to the radial directions 8, 10 and thus to simplify the assembly, the actuating piston 24 is also provided in order to first attach the first housing part 20, the second housing part 22 and the actuating piston 24 while supporting the second housing part 22 in the radial direction 8 outwardly on the actuating piston 24 and while supporting the actuating piston 24 in the radial direction 8 outwardly on the first housing part 20, before the assembly thus assembled is pushed onto the hub 18. Once this assembly is assembled, the first housing part 20 and the second housing part 22 together with the intermediate actuating piston 24 are pushed together onto the hub 18, such that the first housing part 20 can be supported on the projection 30 and the previously described fastening of the first housing part 20 to the hub 18 can be carried out via the weld 46.

REFERENCE NUMERAL LIST 2 actuating device
4 axial direction
6 axial direction
8 radial direction
10 radial direction
12 peripheral direction
14 peripheral direction
16 axis of rotation
18 hub
20 first housing part
22 second housing part
24 actuating piston
26 support section
28 second support section
30 projection
32 third support section
34 projection
36 first fluid line
38 second fluid line
40 first radial section
42 axial section
44 second radial section
46 weld
48 first radial section
50 second radial section
52 axial section 54 end
56 axial support projection
58 seal
60 sealing lip
62 sealing lip
64 first piston section
66 piston surface
68 second piston section
70 force transmission section
72 first seal
74 second seal
76 piston chamber
78 supply chamber
80 through openings
82 compensation chamber
84 third housing part
86 sealing element
88 weld

The invention claimed is:

1. A hydraulic actuating device (2) for a coupling device, the hydraulic actuating device comprising:
an actuating piston (24),
a piston chamber (76) assigned to the actuating piston (24), and
a supply chamber (78) which is arranged further inwards in a radial direction (10) than the piston chamber (76) and via which a hydraulic fluid can be supplied to the piston chamber (76),
wherein the supply chamber (78) is delimited in a first axial direction (4) by a first housing part (20) and in a second axial direction (6) opposite to the first axial direction (4) by a second housing part (22), and the first housing part (20) is fastened to a hub (18), and
wherein the first housing part (20) is fastened to the hub (18) with the second housing part (22) clamped in the axial direction (4, 6) between the first housing part (20) and the hub (18) in a floating manner.

2. The hydraulic actuating device (2) according to claim 1, wherein the second housing part (22) is supported on the hub (18) in the second axial direction (6) indirectly or directly and/or with the interposition of a seal (58).

3. The hydraulic actuating device (2) according to claim 2, wherein the second housing part (22) is supported on the hub (18) in a floating and/or detachable manner in the radial direction (8, 10) and/or without fastening means for axial and/or radial fixing of the second housing part (22) to the hub (18) between the second housing part (22) and the hub (18), and/or the second housing part (22) is supported on the first housing part (20) in the radial direction (8, 10) in a floating and/or detachable manner and/or without fastening means for axially and/or radially fixing the second housing part (22) to the first housing part (20) between the second housing part (22) and the first housing part (20).

4. The hydraulic actuating device (2) according to claim 2, wherein the second housing part (22) is supported on a radially projecting support section (26) of the hub (18).

5. The hydraulic actuating device (2) according to claim 4, wherein the radially projecting support section (26) is formed integrally with the hub (18) and/or circulates in a peripheral direction (12, 14).

6. The hydraulic actuating device (2) according to claim 1, wherein the second housing part (22) is supported indirectly or directly on the first housing part (20) in the first axial direction (4).

7. The hydraulic actuating device (2) according to claim 6, wherein the second housing part (22) has at least two axial support projections (56), which are supported on the first housing part (20) with the formation of intermediate through openings (80) for producing a fluid connection between the supply chamber (78) and the piston chamber (76).

8. The hydraulic actuating device (2) according to claim 6, wherein the first housing part (20) has at least two axial support projections which are supported on the second housing part (22) with the formation of intermediate through openings (80) for producing a fluid connection between the supply chamber (78) and the piston chamber (76).

9. The hydraulic actuating device (2) according to claim 1, wherein the second housing part (22) is supported in the radial direction (8) outwards with the interposition of a seal (72) for sealing the piston chamber (76), on the actuating piston (24), and
wherein the actuating piston (24) is supported.

10. The hydraulic actuating device (2) according to claim 9, wherein an axial section (52) of the second housing part (22) is supported in the radial direction (8) outwards with the interposition of a seal (72) for sealing the piston chamber (76), on the actuating piston (24).

11. The hydraulic actuating device (2) according to claim 9, wherein the actuating piston (24) is supported in the radial direction (8) outwardly on an axial section (42) of the first housing part (20).

12. The hydraulic actuating device (2) according to claim 9, wherein the actuating piston (24) is supported in the radial direction (8) outwardly with the interposition of a seal (74) for sealing the piston chamber (76).

13. The hydraulic actuating device (2) according to claim 1, wherein the piston chamber (76) is assigned a compensation chamber (82) for achieving at least partial centrifugal compensation, wherein the supply chamber (78) is separated from the compensation chamber (82).

14. The hydraulic actuating device (2) according to claim 13, wherein the supply chamber (78) is separated from the compensation chamber (82) by the second housing part (22).

15. The hydraulic actuating device (2) according to claim 14, wherein the supply chamber (78) and the compensation chamber (82) are delimited directly by the second housing part (22).

16. The hydraulic actuating device (2) according to claim 1, wherein at least one fluid line (36) for supplying a hydraulic fluid into the supply chamber (78) and/or at least one fluid line (38) for supplying a compensation fluid into the compensation chamber (82) is formed in the hub (18).

17. A hydraulically actuatable coupling device for the drive train of a motor vehicle, wherein the coupling device includes the hydraulic actuating device (2) according to claim 1.

18. The hydraulically actuatable coupling device according to claim 17, wherein the coupling device is one of a dual clutch and a lamella clutch, and the actuating device (2) serves to actuate an outer coupling of the coupling device, wherein the outer coupling is a concentric dual clutch.

19. A method for manufacturing a hydraulic actuating device (2) of a coupling device, the method comprising the following steps:
providing a hub (18), a first housing part (20) and a second housing part (22),
pushing the second housing part (22) onto the hub (18),
pushing the first housing part (20) onto the hub (18) while clamping the second housing part (22) in an axial direction (4, 6) between the first housing part (20) and the hub (18) and creating a supply chamber (78) in the axial direction (4, 6) between the first and second housing parts (20, 22), and fastening the first housing part (20) to the hub (18) by welding, in which the second housing part (22) is supported on the hub (18) by clamping in a radial direction (8, 10) in a floating and/or detachable manner and/or without fastening means for axial and/or radial fixing of the second housing part (22) to the hub (18) between the second housing part (22) and the hub (18), and in which the second housing part (22) is supported on the first housing part (20) by clamping in the radial direction (8, 10) in a floating and/or detachable manner and/or without fastening means for axial and/or radial fixing of the second housing part (22) to the first housing part (20) between the second housing part (22) and the first housing part (20).

20. The method according to claim 19, further comprising the following steps:

providing an actuating piston (24), and assembling the first housing part (20), the second housing part (22) and the actuating piston (24) while supporting the second housing part (22) in the radial direction (8) outwardly on the actuating piston (24) and the actuating piston (24) in the radial direction (8) outwardly on the first housing part (20), wherein the first housing part (20) and the second housing part (22) together with the actuating piston (24) are pushed onto the hub (18).

\* \* \* \* \*